(12) United States Patent
Yamazaki et al.

(10) Patent No.: US 8,137,079 B2
(45) Date of Patent: Mar. 20, 2012

(54) MOTOR, FAN AND MANUFACTURING METHOD OF THE SAME

(75) Inventors: Shoki Yamazaki, Kyoto (JP); Hideki Nagamatsu, Kyoto (JP); Masaki Adachi, Kyoto (JP)

(73) Assignee: Nidec Corporation, Kyoto (JP)

( * ) Notice: Subject to any disclaimer, the term of this patent is extended or adjusted under 35 U.S.C. 154(b) by 1034 days.

(21) Appl. No.: 12/052,757

(22) Filed: Mar. 21, 2008

(65) Prior Publication Data

US 2008/0232983 A1 Sep. 25, 2008

(30) Foreign Application Priority Data

Mar. 23, 2007 (JP) .................................. 2007-077945

(51) Int. Cl.
*F04B 35/04* (2006.01)
(52) U.S. Cl. ........................................................ 417/354
(58) Field of Classification Search ................... 417/354
See application file for complete search history.

(56) References Cited

U.S. PATENT DOCUMENTS

| | | | |
|---|---|---|---|
| 4,955,791 A * | 9/1990 | Wrobel ........................ | 417/354 |
| 6,359,354 B1 | 3/2002 | Watanabe et al. | |
| 6,379,126 B1 * | 4/2002 | Konno ..................... | 417/423.1 |
| 6,674,204 B1 * | 1/2004 | Horng et al. ............. | 310/156.12 |
| 6,926,498 B2 * | 8/2005 | Li et al. ............................ | 416/3 |
| 7,909,586 B2 * | 3/2011 | Yu et al. ........................ | 417/354 |
| 2001/0036416 A1 * | 11/2001 | Obara ........................ | 417/423.1 |
| 2002/0028146 A1 | 3/2002 | Otsuka | |
| 2004/0136842 A1 * | 7/2004 | Obara et al. .................. | 417/354 |
| 2004/0191088 A1 * | 9/2004 | Matsumoto ................... | 417/354 |

FOREIGN PATENT DOCUMENTS

| | | |
|---|---|---|
| DE | 2732763 A1 | 7/1977 |
| DE | 102005006184 A1 | 8/2006 |
| JP | 08266004 | 10/1996 |

* cited by examiner

*Primary Examiner* — Devon C Kramer
*Assistant Examiner* — Ryan Gatzemeyer
(74) *Attorney, Agent, or Firm* — Keating & Bennett, LLP

(57) ABSTRACT

A motor according to the present invention preferably includes a boss portion preferably includes an inner ring portion including a substantially ring shaped convex portion at an axially lower end surface thereof. The boss portion preferably includes a through hole at which a shaft is press fitted at a central portion thereof. A rotor holder including a substantially cylindrical shape includes a through hole centered about a rotary axis. The through hole and the inner ring portion of the boss portion are fitted to one another. The convex portion includes a portion plastically deformed outwardly in the radial direction to sandwich an inner circumferential surface of the rotor holder. The inner circumferential surface of the impeller cup portion includes a plurality of convex portions near an upper portion thereof. The rotor holder is press fitted into the inner circumferential surface of the impeller cup portion via the convex portions.

13 Claims, 15 Drawing Sheets

MOTOR, FAN AND MANUFACTURING METHOD OF THE SAME

BACKGROUND OF THE INVENTION

1. Field of the Invention

The present invention relates to a connection method between a rotor holder and a cup portion of an impeller of a fan.

2. Description of the Related Art

Conventionally, electronic devices have been generating higher amounts of heat as the number and/or capacity of their electronic components and processing units has expanded to meet current demand for higher performance devices. To this end, a fan is typically used to cool the electronic components and processor units of an electronic device. In order to achieve the characteristics (air quantity, static pressure, etc) required of the fan incorporated in the electronic devices, the fan is expected to rotate at a high speed. On the other hand, the fans incorporated in the electronic devices that are used at home and/or office environments are expected to operate quietly. To meet such expectations (i.e., reduction of high frequency noise, etc) while achieving the aforementioned characteristics, a large fan, for example, rotating at a low speed may be effective.

One of the factors for the noise which is heard when the fan rotates at a high speed is generated by the blades of the fan coming into contact with air at the high speed. Also, when the fan rotates at a low speed, other factors generate noise, such as electromagnetic sound generated by a control circuit, sliding sound generated by a bearing portion of the motor, vibration sound generated by other components of the motor. In particular, the vibration sound generated by either a rotor holder or an impeller of the motor which are assembled with one another is noticeable.

In general, it is a difficult task to join an impeller made of a resin material with a rotor holder of a large size fan (e.g., a fan whose impeller has a diameter greater than 110 mm).

Also, in general, a fan includes a cup portion having a substantially cylindrical shape, a plurality of blades arranged outside of the cup portion, and a rotor holder having a substantially cylindrical shape press fitted into the inner circumferential surface of the cup portion. When a size of the fan increases and when a force required to press fit the rotor holder into the impeller, the cup portion may be damaged (i.e., deformed, cracked or the like). On the other hand, when a force used to press fit the rotor holder into the impeller is compromised, the impeller may be removed easily from the rotor holder. That is to say, a force used to press fit the rotor holder with respect to the impeller cup portion is determined by the material used to form the impeller and the rotor holder and the size thereof, and includes a narrow range of acceptable amount.

For example, although an about equal amount of force may deform (i.e., crack or the like) the cup portion almost regardless of the size of the fan, a force required to retain the rotor holder with respect to the cup portion differs depending on a diameter of the inner circumferential surface of the cup portion. For such reason, the amount of force used to press fit the rotor holder into the cup portion is increased in accordance with the diameter of the inner circumferential surface of the cup portion in order to increase the amount of stress applied to the cup portion. Alternately, a thickness (i.e., a distance between the external surface and the inner surface of the cup portion) of the cup portion may be increased. Therefore, the conventional method joining the rotor holder and the cup portion is problematic.

Further, since it is highly difficult to join an impeller and a rotor holder by press fitting the rotor holder into the cup portion of the impeller, large size fans include a shaft which is affixed to an impeller via a boss portion by an insert molding. In particular, the rotor holder includes a through hole at which the boss portion is arranged. Then, a portion of the boss portion is plastically deformed at which the rotor holder is secured. In other words, the rotor holder is caulked with the boss portion.

Such method, however, allows the vibrations generated by the cup portion of the impeller and that generated by other components of the motor to resonate, which, when the impeller rotates at a low speed, becomes particularly noticeable.

SUMMARY OF THE INVENTION

In order to overcome the problems described above, the motor according to the present invention comprises a shaft rotating centered about a rotary axis, a cup portion having a substantially cylindrical shape, including at a central portion thereof a boss portion at which one axial end of the shaft is affixed, and rotating along with the boss portion and the shaft about the rotary axis, a rotor holder having a substantially cylindrical shape arranged at an inner side of the cup portion, a rotor magnet having a substantially annular shape arranged at an inner circumferential surface of the rotor holder, and an armature arranged opposite to the rotor magnet in a radial direction to generate between the rotor magnet a torque centered about the rotary axis. A lid portion of the rotor holder includes at a center thereof a through hole through which a portion of the boss portion is securely inserted, the cup portion includes at an inner circumferential surface thereof a plurality of convex portions arranged in a circumferential direction and each protruding inwardly in the radial direction, and the rotor holder is supported by an inner most tip portion of the convex portions.

Other features, elements, steps, characteristics and advantages of the present invention will become more apparent from the following detailed description of preferred embodiments thereof with reference to the attached drawings.

DETAILED DESCRIPTION OF THE PREFERRED EMBODIMENTS

A) First Preferred Embodiment

Figure 1:
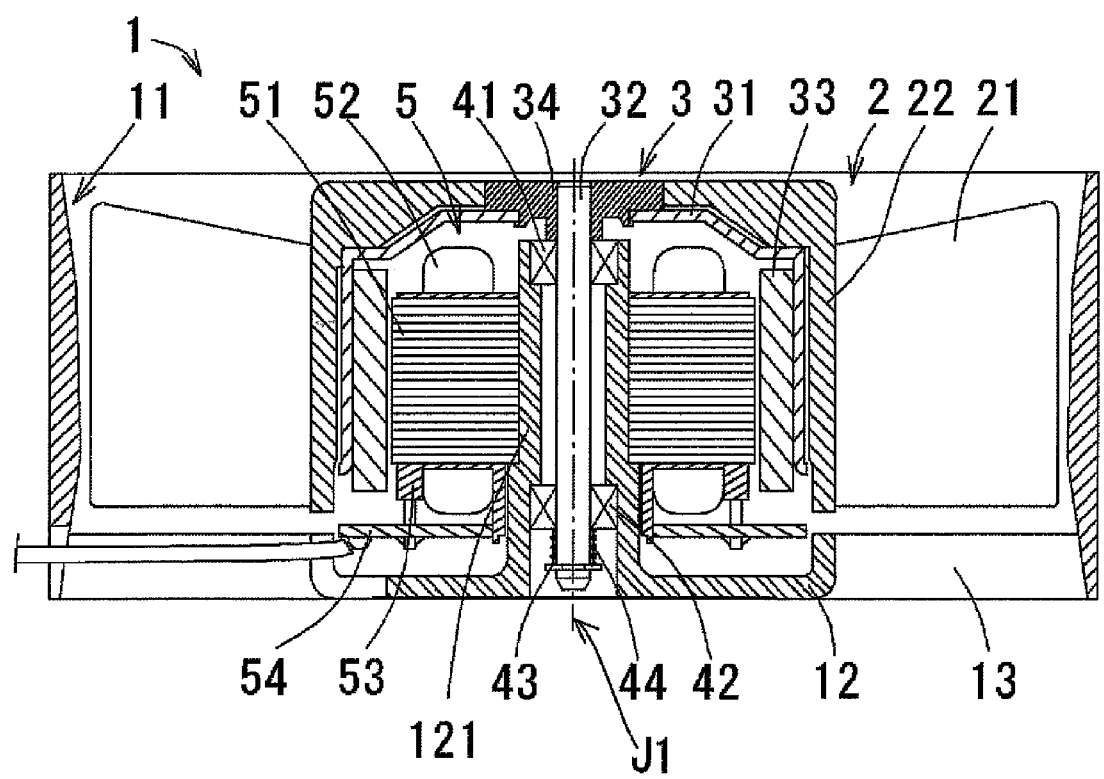
FIG. 1 is a schematic cross sectional view of a fan according to a first preferred embodiment of the present invention.

Note that in the description of preferred embodiments of the present invention herein, words such as upper, lower, left, right, upward, downward, top, and bottom for describing positional relationships between respective members and directions merely indicate positional relationships and directions in the drawings. Such words do not indicate positional relationships and directions of the members mounted in an actual device. Also note that reference numerals, figure numbers, and supplementary descriptions are shown below for assisting the reader in finding corresponding components in the description of the preferred embodiments below to facilitate an understanding of the present invention. It is understood that these expressions in no way restrict the scope of the present invention.

Figure 2:
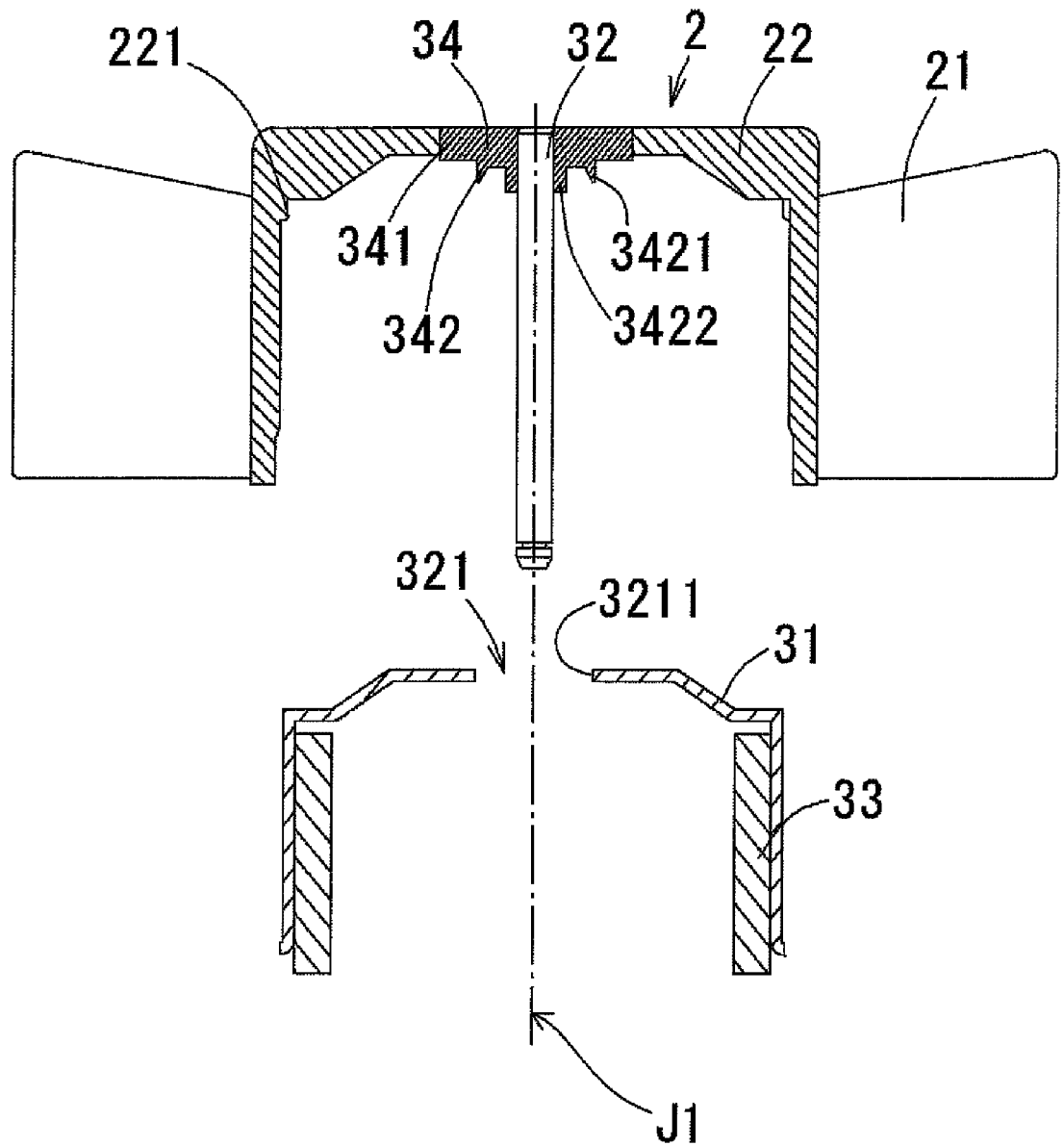
FIG. 2 is a schematic cross sectional view of an impeller and a rotor holder according to the first preferred embodiment of the present invention.
Figure 3:
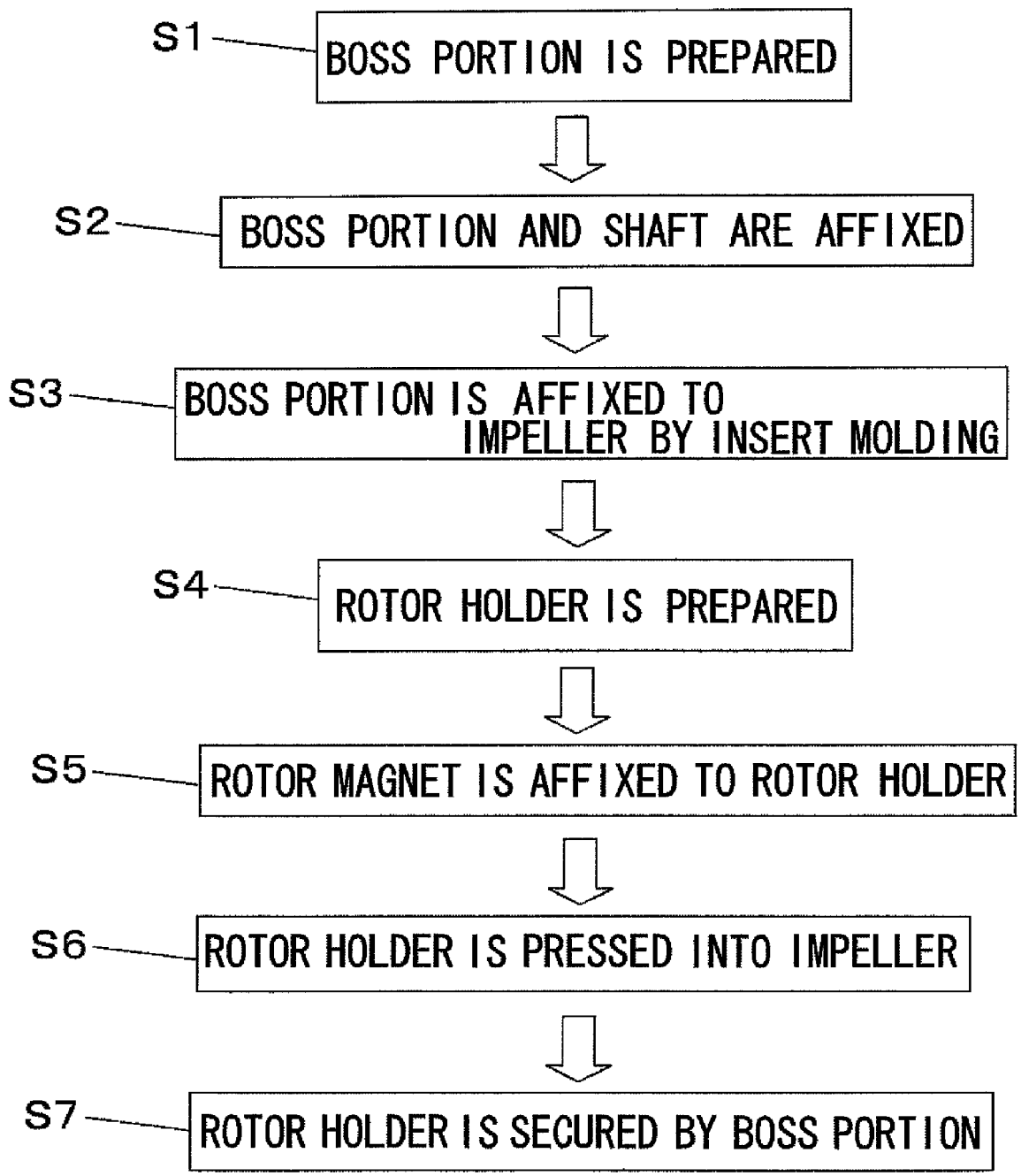
FIG. 3 is a flow chart illustrating a flow of steps of a manufacturing method of the impeller and the rotor holder according to first preferred embodiment of the present invention.

Hereinafter, a first preferred embodiment of the present invention will be described. FIG. 1 is a schematic cross sectional view of a fan 1 according to the first preferred embodiment of the present invention. FIG. 2 is a schematic cross sectional view of an impeller 2 and a rotor holder 31 according to the first preferred embodiment of the present invention. FIG. 3 is a flow chart flow chart illustrating a flow of steps of a manufacturing method of the impeller 2 and the rotor holder 31 according to first preferred embodiment of the present invention.

According to the fan 1 of the present preferred embodiment, an impeller cup portion 22 is preferably arranged outside of the rotor holder 31 which preferably includes a substantially cylindrical shape and which rotates when an electric current is supplied thereto. A plurality of blades 21 are preferably arranged at an outer circumferential surface of the impeller cup portion 22 so as to generate an air flow when the impeller cup portion 22 rotates. The impeller cup portion 22 and the blades 21 preferably form the impeller 2. A shaft 32 is preferably arranged at a substantially central portion of the impeller cup portion 22 via a boss portion 34 (described below).

The fan 1 preferably includes a base portion 12 which preferably include a bearing housing 121 having a substantially cylindrical shape at a substantially central portion thereof. The bearing housing 121 preferably includes the shaft 32, the ball bearings 41, 42, and a pair of step portions corresponding to the ball bearing 41 and 42 respectively so as to secure the axial positions of the ball bearings 41 and 42. The ball bearings 41 and 42 each preferably include a plurality of balls arranged at a space between an inner ring and an outer ring of the ball bearings 41 and 42 wherein the inner ring rotates with respect to the outer ring. The shaft 32 is preferably inserted through the inner ring of the ball bearing 41 and that of the ball bearing 42 so as to collectively form a bearing portion. A ring member 43 is preferably arranged at a lower portion of the shaft 32 in order to retain the shaft 32. Note that a coil spring 44 is preferably arranged between the ball bearing 42 and the ring member 43 in order to provide pressure to the ball bearings 41 and 42. It is to be appreciated that the bearing mechanism of the present invention is not limited to the ball bearing.

The inner ring of the ball bearing 41 is preferably supported by a lower end surface (which will be described below) of the boss portion 34. In such configuration, it is important to minimize the contact between the boss portion 34 and the outer ring of the ball bearing 41 in order to reduce the noise. According to the present preferred embodiment, the boss portion 34 is preferably made of a metal material. Although it is possible to form the boss portion 34 by using the same material (i.e., resin) as that used for the impeller cup portion 22 by injection molding, it is preferable that the boss portion 34 is made of a metal material, particularly when the same is used to determine the position of the ball bearing 41. It also needs to be appreciated that when the boss portion 34 is made of the resin material using the injection molding, a desirable precision may not be achieved.

The armature 5 is supported by the outer circumferential surface of the bearing housing 121. The armature 5 preferably includes a stator core 51, a plurality of coils 52, and an insulator 53. Also, the armature 5 preferably includes a circuit board 54 preferably arranged at a lower end portion of the armature 5. The coils 52 are formed by winding a wire around a plurality (eight in the present preferred embodiment) of teeth (not shown) via the insulators 53 covering the teeth in the axial direction. The circuit board 54 preferably including a drive control circuit which is a plurality of electronic components (not shown) arranged at the print circuit board and controls the rotation of the impeller 2 is connected to the coils 52 and is securely arranged at the lower portion of the insulator 53. A magnetic field is generated when the electric current supplied from an outside power supply is conducted to the coils 52 via the electronic components including an IC and/or Hall element.

The rotor holder 31 which minimizes magnetic flux leakage is arranged at the inner circumferential surface of the impeller 2. A rotor magnet 33 which is magnetized such as to include characteristics of multiple magnetic poles alternately arranged in the circumferential direction is arranged inside the rotor holder 31. The boss portion 34 at which the shaft 32 is affixed at one axial thereof is preferably arranged at a substantially central portion of the impeller cup portion 22.

The rotor magnet 33 and the stator core 51 are preferably arranged radially opposite to one another. When the electric current is conducted to the coils 52, a magnetic field generated by the stator core 51 interacts with a magnetic field generated by the rotor magnet 33 generating a rotary torque at the impeller 2 causing the impeller 2 to rotate. The Hall element detects a change in the magnetic flux of the rotating rotor magnet 33 which is controlled by the IC so as to allow the impeller 2 to rotate in a reliable manner. When the impeller 2 rotates an air flow will be generated in the axial direction.

The circuit board 54 is preferably arranged axially opposite to the base portion 12 which also includes a substantially cylindrical shape and preferably surrounds an outer end of the circuit board 54. The base portion 12 is preferably connected to a housing 10 via a plurality (four in the present preferred embodiment) ribs 13 which are arranged evenly apart from one another in the circumferential direction. The housing 10 preferably surrounds the impeller 21 in the radial direction such as to form a passage for the air flow. The housing 10 preferably includes a substantially rectangle shape at both axial ends thereof. Note that although the present preferred embodiment assumes the cross sectional view of the housing 10 includes the substantially rectangle shape, the present invention is not limited thereto.

Note that since the housing 10 for the fan 1 according to the present preferred embodiment is a large size (e.g., approximately 120 cm×approximately 120 cm) fan, the diameter of the impeller 2 becomes correspondingly large, and therefore, the joining method between the rotor holder 31 and the impeller cup portion 22 becomes an important issue. Also, since the larger the fan is, the heavier the impeller and the rotor holder thereof become which requires that the joining force between therebetween to be also large. Also, when the inner diameter of the impeller cup portion 22 is increased, it becomes difficult to achieve the force necessary to securely affix the rotor holder 31 to the impeller cup portion 22.

In order to increase a retaining strength of the impeller cup portion 22 with respect to the rotor holder 31, the impeller cup portion 22 needs to apply a high pressure inwardly to the rotor holder 31. In order to achieve this, an external diameter of the rotor holder 31 may be designed larger than an inner diameter of the impeller cup portion 22 at which the rotor holder 31 is pressed. This method, however, may generate a large stress against the cylindrical portion of the impeller cup portion 22. When the difference between the diameter of the rotor holder 31 and that of the impeller cup portion 22 is excessively large, the cylindrical portion of the impeller cup portion 22 may be damaged. Also, when the difference between the diameter of the rotor holder 31 and that of the impeller cup portion 22 is too small, the pressure generated between the rotor holder 31 and the impeller cup portion 22 may not be enough to securely retain the impeller cup portion 22. When the radial thickness of the cylindrical portion of the impeller cup portion 22 is increased, a tensile strength working against the stress in the circumferential direction generated within the impeller cup portion 22 will be increased. When the external diameter of the impeller cup portion 22 is increased, an area of the passage for the air flow will be reduced which compromises the volume of air flow.

When a fan having an impeller cup portion with a large inner diameter and another with a small diameter had an identical the difference between the diameter of the rotor holder where the impeller cup portion 22 makes contact with and the inner diameter of the impeller cup portion 22, the fan having the impeller cup portion with a small diameter generates greater stress applied to the rotor holder 31. In general, an amount of stress applied to the cylindrical portion of the impeller cup portion 22 may be denoted by a following equation in which the inner diameter of the impeller cup portion 22 is R, the pressure the impeller cup portion 22 applies to the rotor holder 31 is P, and the radial thickness of the cylindrical portion of the impeller cup portion 22 is T.

$$\sigma = PR/T$$

Therefore, when P and T are constant, the greater R is the greater the value for σ becomes. That is, the fan having the impeller cup portion 22 having a large diameter may be damaged. Also, in order to reduce the amount of stress applied to the cylindrical portion of the impeller cup portion 22, the value of T may be increased or the value of P may be decreased. Thus, press fitting as a joining method between the impeller cup portion 22 and the rotor holder 31 is not particularly suited for the fan having the impeller cup portion 22 having a large inner diameter.

As shown in FIG. 2, the boss portion 34 is affixed at a central portion of the impeller 2 concentrically with the rotary axis J1. The boss portion 34 preferably having a substantially annular shape is preferably made of a metal material by cutting. The boss portion 34 preferably includes an outer ring portion 341 and an inner ring portion 342. The inner ring portion 342 preferably includes an annular shaped convex portion 3421 at an outer circumferential edge in the axial direction. Also, the inner ring portion 342 preferably includes at a substantially central portion thereof a cylindrical portion 3422 which supports the shaft 32 and preferably protrudes downwardly in the axial direction (step S1). The boss portion 34 includes a through hole at the substantially central portion thereof so as to affix an upper end of the shaft 32 (step S2).

The boss portion 34 is preferably joined to the impeller 2 at an outer circumferential surface of the outer ring portion 341. The impeller 2 preferably made of a resin material is preferably formed by an injection molding continuously with the plurality of blades 21 and the impeller cup portion 22. According to the present preferred embodiment, the boss portion 34 is arranged in the mold used to form the impeller 2 and the resin material is supplied to the outer circumferential surface of the outer ring portion 341 of the boss portion 34 so as to join the impeller 2 and the boss portion 34 as a single component (step S3). The above described method is generally referred to as an insert molding. Also, according to the present preferred embodiment, the outer circumferential surface of the outer ring portion 341 of the boss portion 34 preferably includes knurled grooves or the like in order to increase the joining force between the bass portion 34 and the impeller 2. Note that although the present preferred embodiment assumes that the impeller 2 is formed by the injection molding, the present invention is not limited thereto; the impeller 2 may be made of an aluminum alloy and by a die casting.

Heafter, the rotor holder 31 will be described in detail. As shown in FIG. 2, the rotor holder 31 preferably includes a substantially cylindrical shape with a lid portion. The lid portion of the rotor holder 31 preferably includes at a central portion thereof a through hole 321 concentric with the rotary axis J1 (step S4). The rotor magnet 33 preferably having an annular shape is arranged at the inner circumferential surface of the cylindrical portion of the rotor holder 31 (step S5) The rotor magnet 33 is preferably magnetized in the circumferential direction by a magnetizing yoke while the same is affixed to the inner circumferential surface of the cylindrical portion of the rotor holder 31. According to the present preferred embodiment, the rotor magnet 33 preferably includes eight magnetic poles.

Hereafter, a process of joining the rotor holder 31 with the impeller 2 will be described. The rotor holder 31 already affixed with the rotor magnet 33 is inserted into the inner circumferential surface of the impeller cup portion 22. The rotor holder 31 is affixed to the impeller 2 by the boss portion 34. The through hole 321 is arranged such that an inner circumferential surface 3211 (see FIG. 2) includes a portion thereof that preferably makes contact with the outer circumferential surface of the inner ring portion 342 of the boss portion 34. Note, however, that although the present preferred embodiment assumes that the outer circumferential surface of the inner ring portion 342 makes contact with the inner circumferential surface 3211 of the through hole 321, the present invention is not limited thereto.

Figure 4:
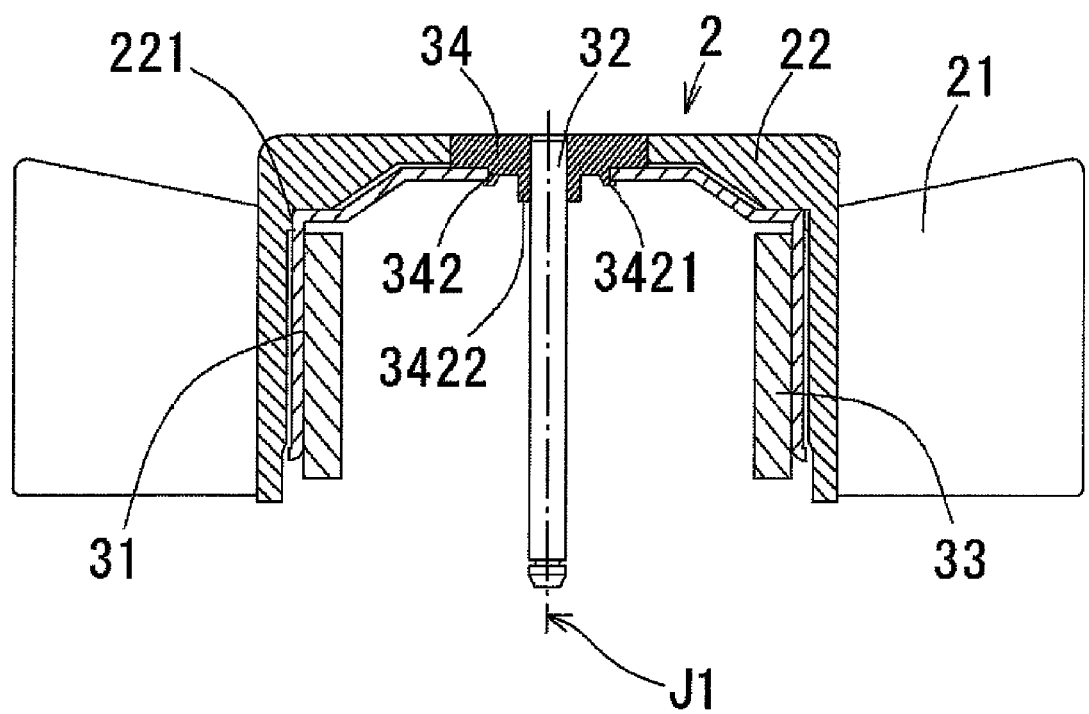
FIG. 4 is a schematic cross sectional view of the impeller and the rotor holder affixed to one another according to the first preferred embodiment of the present invention.

FIG. 4 is a schematic cross sectional view of the impeller 2 affixed with the rotor holder 31 according to the first preferred embodiment. An upper end surface of the rotor holder 31 makes contact with the boss portion 34, then the annular shaped convex portion 3421 is plastically deformed outwardly in the radial direction by a pressing machine. By this, a portion of the rotor holder 31 is sandwiched by the plastically deformed annular shaped convex portion 3421 and another portion of the boss portion 34 (step S7). By virtue of such configuration, the connection between the rotor holder 31 and the boss portion 34 is further strengthened.

The joining method described above is commonly referred to as a deformation method (e.g., caulking or the like). Note that although the present preferred embodiment assumes that the rotor holder 31 is secured with the impeller 2 by the deformation method, the present invention is not limited thereto.

Figure 7:
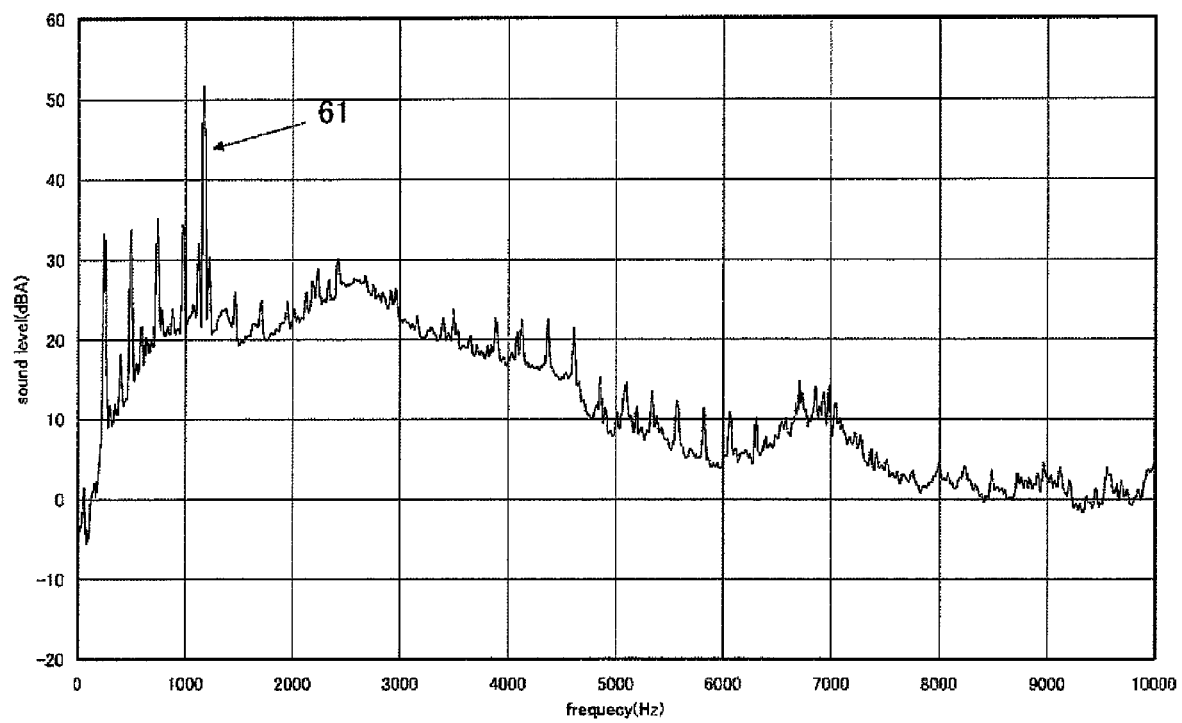
FIG. 7 is a diagram illustrating a correlation between a sound level and frequency generated by a conventional fan when an impeller thereof rotates at a 2900 rpm.

FIG. 7 is a schematic diagram illustrating a correlation between a sound level and frequency generated by a conventional fan when the impeller thereof rotates at a 2900 rpm. Note that for the diagrams illustrated in FIGS. 7 to 11, horizontal axes denote frequency (Hz) and vertical axes denote sound level (dBA). Conventionally, the impeller 2 and the rotor holder 31 are affixed to one another solely by the deformation method. However, in such a case, when the impeller 2 rotates at a certain speed, the impeller cup portion 22 vibrates. When the vibration of the impeller cup portion 22 resonates with a vibration of the stator core 51 caused by the cogging between the rotor magnet 33 and the stator core 51 noise will be increased (denoted by dBA). For example, when the impeller 2 rotates at 2900 rpm, as shown in FIG. 7, the sound level peaks at a point 61 which is indicated therein. According to the present preferred embodiment, the motor preferably includes the rotor magnet 33 which has eight magnetic poles and the stator core 51 which has twelve slots. That is, the primary frequency of the cogging of the motor when the impeller rotates at 2900 rpm is 1160 Hz (i.e., 2900 rpm divided by 60 multiplied by 24, which is a least common denominator between the number of magnetic poles and the number of slots of the stator core 51). Therefore, when the impeller 2 rotates at 2900 rpm, the cogging and the impeller 2 resonate at about 1160 Hz.

Figure 5:
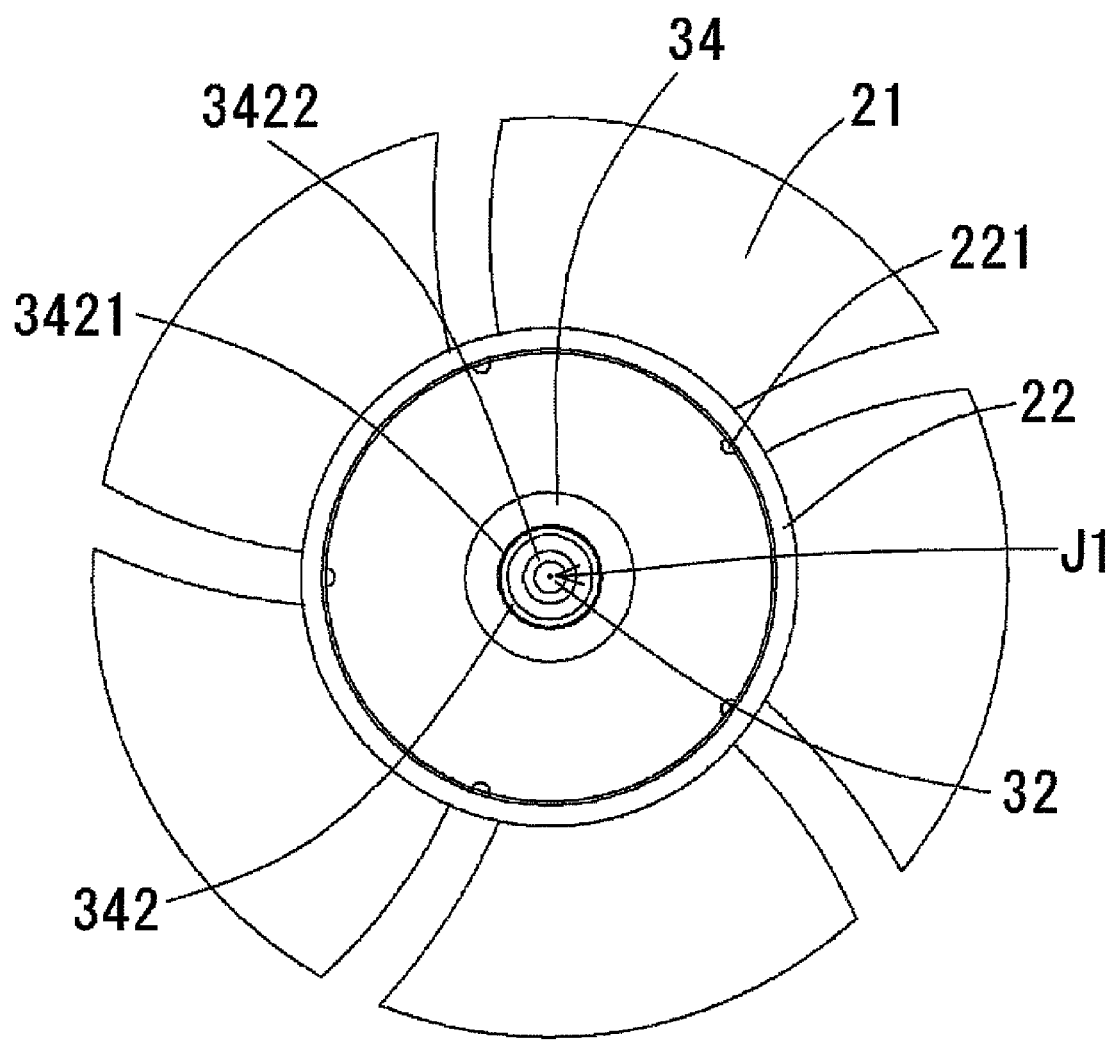
FIG. 5 is a schematic plan view of the impeller according to the first preferred embodiment of the present invention.

Since the rotation of 2900 rpm of an impeller 2 for a fan in general is relatively slow and the sound generated by the contact between the blades and the air is relatively small, the value for the sound level of the resonance between the cogging and the impeller 2 generates a prominent peak. Therefore, according to the present preferred embodiment, in order to minimize the resonance between the cogging and the impeller 2, a following configuration is preferably executed. FIG. 5 is a schematic plan view looking upwardly of the impeller 2 according to the present preferred embodiment. As shown in FIGS. 2 and 5, the impeller 2 preferably includes at an upper portion of the inner circumferential surface of the impeller cup portion 22 a plurality (five in the present preferred embodiment) of convex portions 221 extending in the axial direction. Note that an envelope surface preferably includes a diameter formed by connecting an inner circumferential end of the convex portions 221 smaller than the external diameter of the rotor holder 31. That is, when the rotor holder 31 is arranged inside the impeller cup portion 22 and a contact is made between the rotor holder 31 and the boss portion 34, the outer circumferential surface of the rotor holder 31 is pressed into the inner circumferential ends of the convex portions 221 (step S6). Since the rotor holder 31 is secured at the boss portion 34 and the convex portions 221, the proper oscillation of the impeller cup portion 22 will be shifted to a higher frequency domain. That is, when the impeller 2 rotates at 2900 rpm, the resonance will not occur at approximately 1160 Hz which is the frequency of the cogging.

Figure 8:
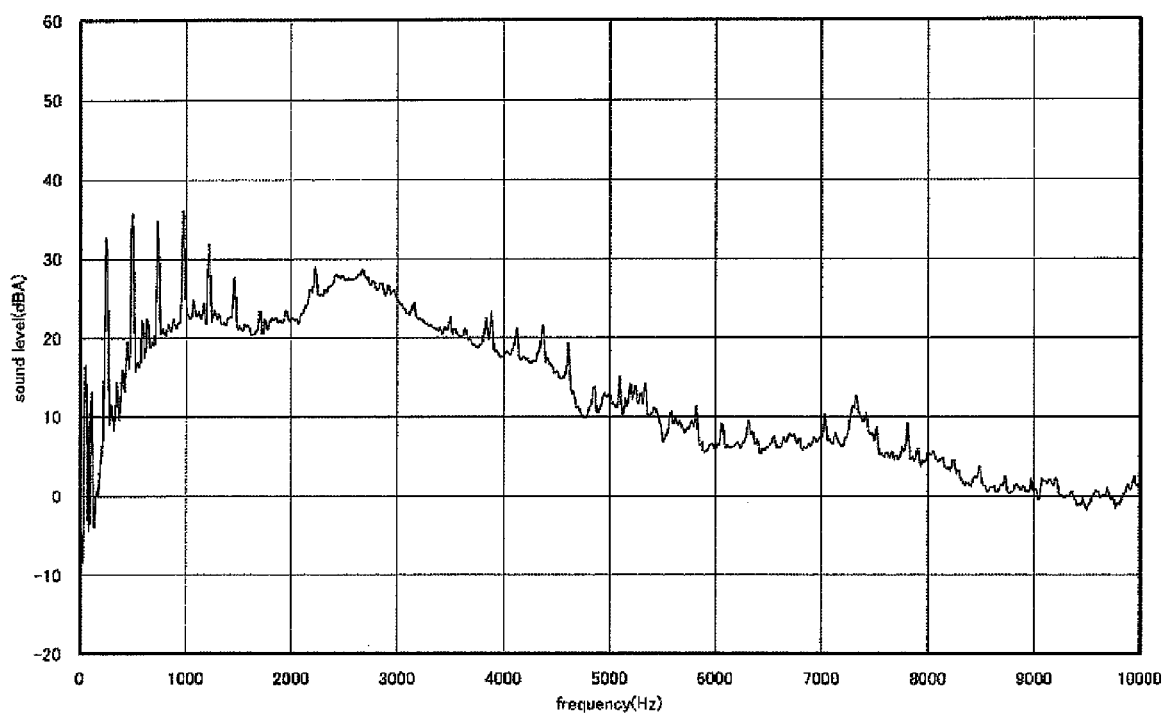
FIG. 8 is a diagram illustrating a correlation between a sound level and frequency generated by MODEL 1 when an impeller thereof rotates at a 2900 rpm.
Figure 9:
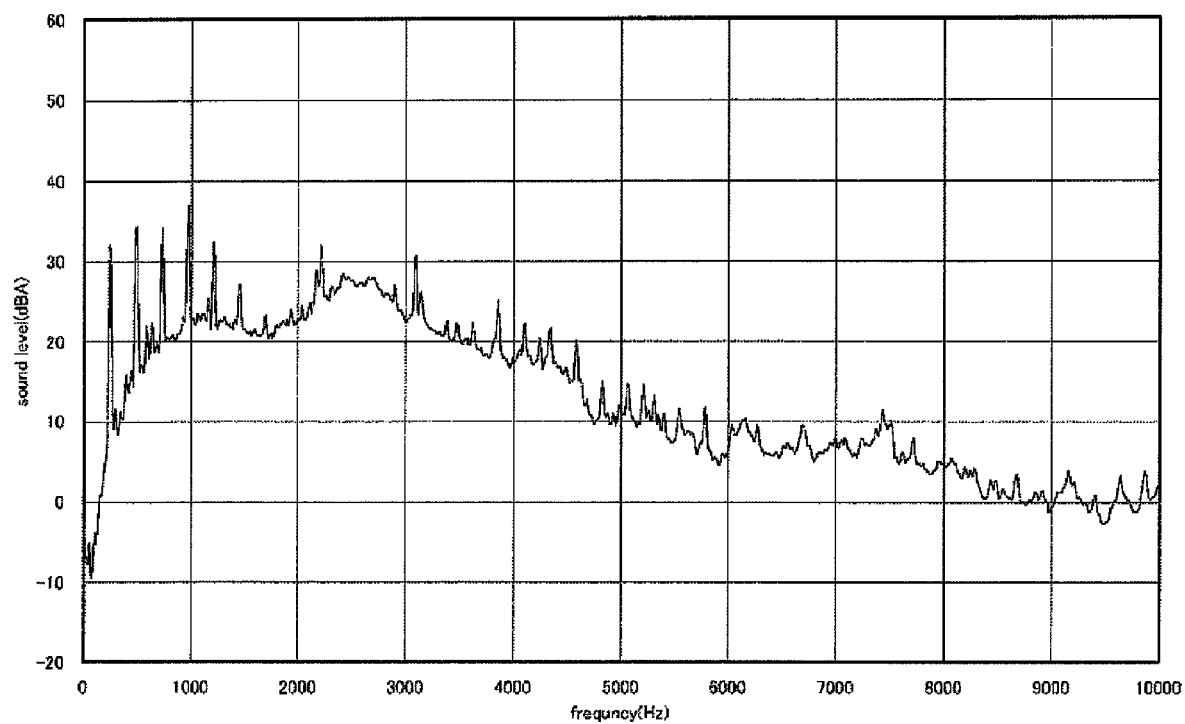
FIG. 9 is a diagram illustrating a correlation between a sound level and frequency generated by MODEL 2 when an impeller thereof rotates at a 2900 rpm.
Figure 10:
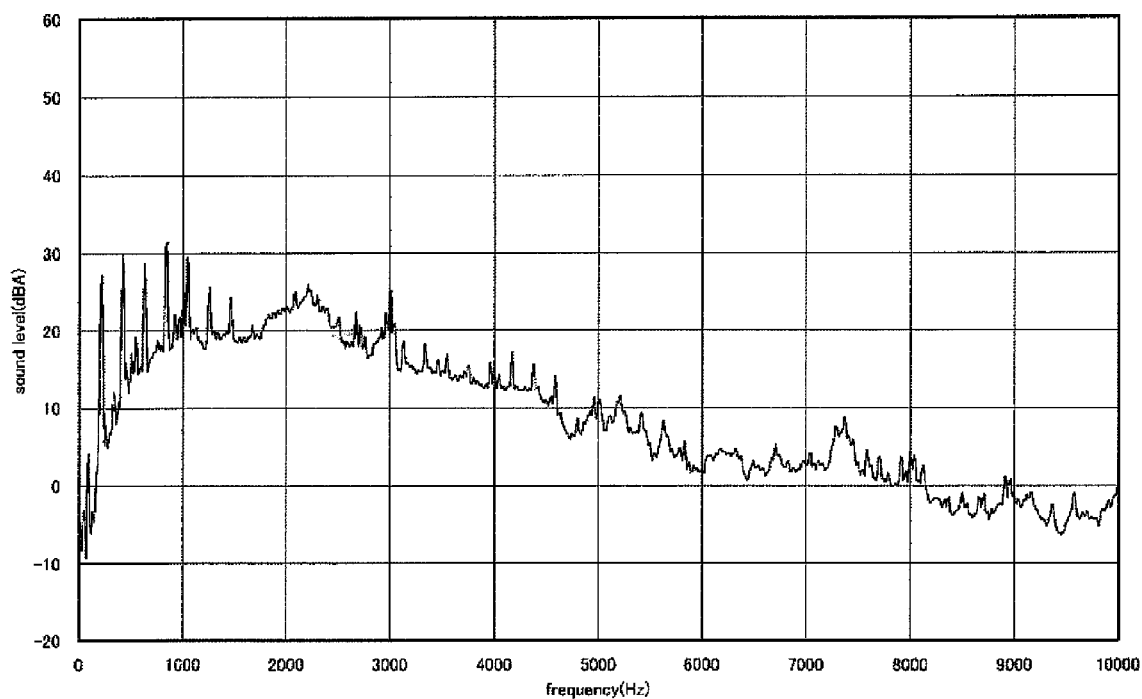
FIG. 10 is a diagram illustrating a correlation between a sound level and frequency generated by MODEL 1 when an impeller thereof rotates at a 2500 rpm.
Figure 11:
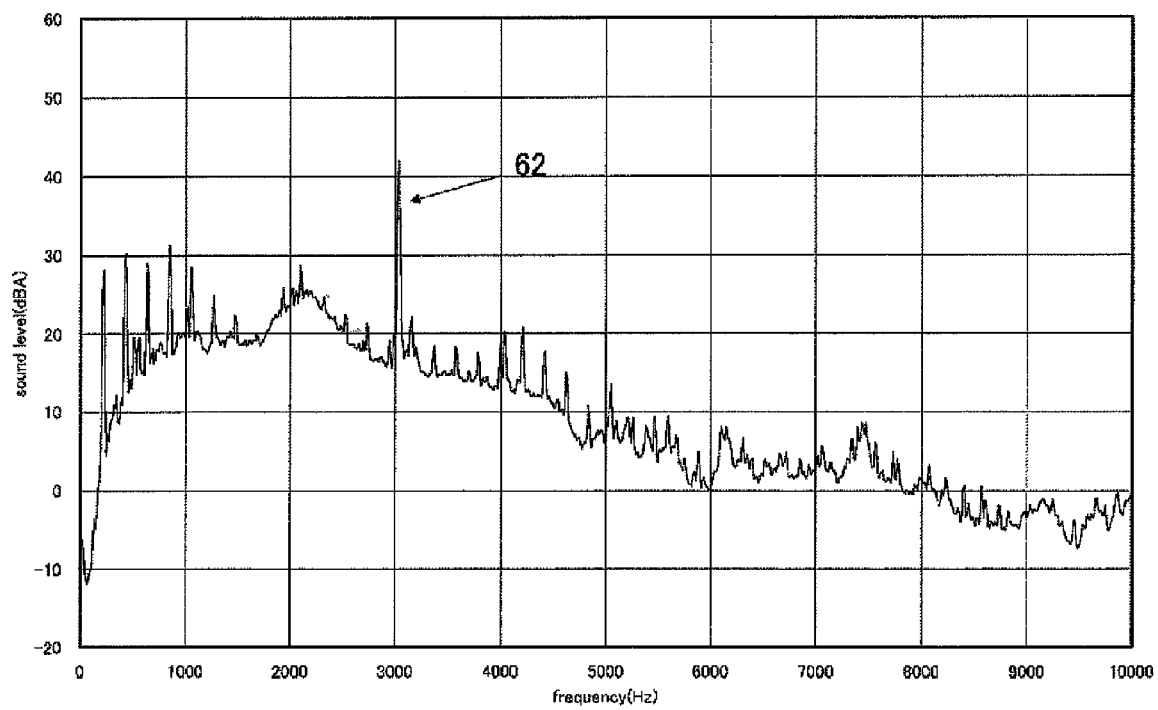
FIG. 11 is a diagram illustrating a correlation between a sound level and frequency generated by MODEL 2 when an impeller thereof rotates at a 2500 rpm.

Here, a comparison is made between two types of convex portions 221 in which one type includes a convex portion 221 extending longer in the axial direction and the values for the sound level is examined. Note that a type having the shorter convex portion 221 in the axial direction will be referred to as MODEL 1, and the type having the longer convex portion 221 in the axial direction will be referred to as MODEL 2. FIG. 8 is a schematic diagram illustrating the correlation between the sound level of the impeller 2 when the same rotates at 2900 rpm and the frequency according to MODEL 1. FIG. 9 is a schematic diagram illustrating the correlation between the sound level of the impeller 2 when the same rotates at 2900 rpm and the frequency according to MODEL 2. FIG. 10 is a schematic diagram illustrating the correlation between the sound level of the impeller 2 when the same rotates at 2500 rpm and the frequency according to MODEL 1. FIG. 11 is a schematic diagram illustrating the correlation between the sound level of the impeller 2 when the same rotates at 2500 rpm and the frequency according to MODEL 2. As shown in FIGS. 8 and 9, when the impellers 2 of MODEL 1 and MODEL 2 rotate at 2900 rpm, no peak for the sound level as shown in FIG. 7 is seen. When the impeller 2 of MODEL 2 rotates at 2500 rpm, the sound level prominently peaks at a point 62 at approximately 300 Hz as shown in FIG. 11. On the other hand, as shown in FIG. 10, when the impeller 2 of MODEL 1 rotates at 2500 rpm, there is no such peak. According to the present preferred embodiment, when the motor rotates at 2500 rpm, the frequency (i.e., primary frequency) of the cogging is approximately 1000 Hz (i.e., 2500 rpm divided by 60 multiplied by 24). Cogging resonates when a vibrating object having a domain of frequency is near another having a similar domain of frequency or integral multiples thereof. Regarding MODEL 2, since the convex portions 221 are long in the axial direction, proper oscillation frequency of the impeller 2 becomes, compared with that of MODEL 1, greater. The proper oscillation frequency of the impeller 2 of MODEL 2 according to the present preferred embodiment is 3000 Hz. That is, the impeller 2 of MODEL 2 resonates with a third order frequency of the cogging. On the other hand, the impeller 2 of MODEL 1 does not resonate with the cogging regardless of the rotation speed (i.e., 2900 rpm or 2500 rpm). That is to say, by adjusting the axial length of the convex portions 221, the resonance may be minimized. In particular, the axial length of the convex portions 221 is preferably smaller than a half of the axial length of the rotor holder 31. Also, it is to be appreciated that when the number of the convex portions 221 is increased to be greater than five, the value of the proper oscillation frequency of the impeller 2 is increased; and when the number of the convex portions 221 is decreased to be smaller than five, the value of the proper oscillation frequency of the impeller 2 is decreased. That is, the resonance may be minimized by adjusting the number of the convex portions 221.

Figure 6:
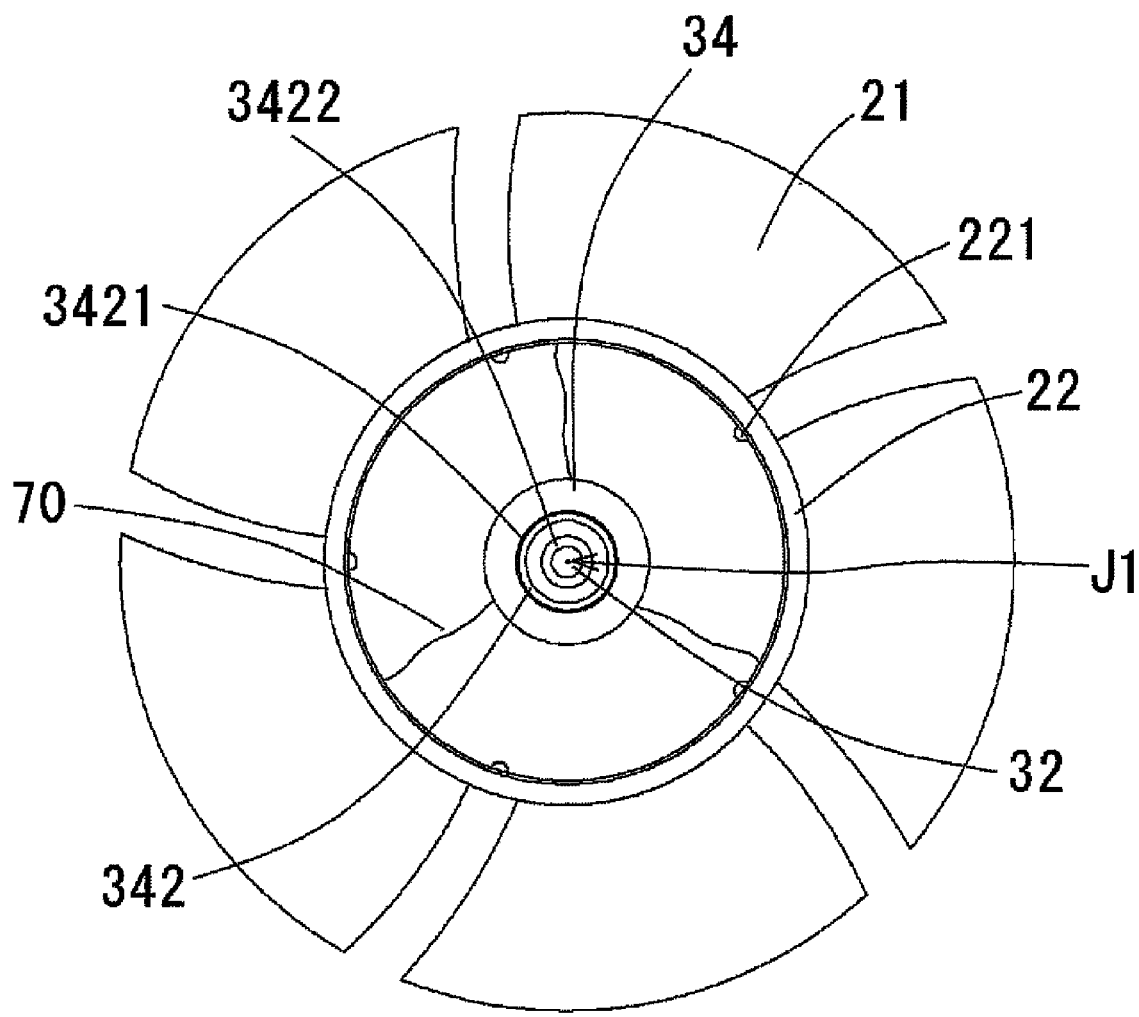
FIG. 6 is a schematic plan view of the impeller including weld lines according to the first preferred embodiment of present invention.

FIG. 6 is a schematic plan view of the impeller 2 including weld lines. As described above, the impeller 2 is formed by injection molding. In general, the resin material is injected into the mold via a plurality of gate portions which are evenly arranged centered about the shaft 32. Due to such configuration, when the resin material which are injected via different gate portions meet at certain points and/or lines within the mold forming referred to as weld lines (hereafter, referred to as weld line 70) which typically extend in the radial direction centered about the central portion. Therefore, the impeller 2 which is seemingly a single component includes an uneven distribution of durability.

When the rotor holder 31 is inserted into the impeller cup portion 22, a stress is applied to the convex portions 221 in an outward direction. Therefore, it is important that the arrangement of the convex portions 221 do not overlap with the weld lines 70. According to the present preferred embodiment, the weld lines 70 and the convex portions 221 do not overlap and therefore, the durability of the impeller cup portion 22 is secured.

When the durability of the impeller cup portions 22 of MODEL 1 and MODEL 2 are compared with respect to the insertion of the rotor holder 31, that of MODEL 1 is greater because the upper in the axial direction a portion to which the stress is applied is arranged the better the durability of the impeller cup portion is retained. Therefore, it is preferable that the convex portions 221 are shorter in the axial direction and arranged at an upper portion of the impeller 2.

Hereinafter, a fan according to a second preferred embodiment of the present invention will be described. Note that a fan 1A according to the second preferred embodiment is identical with that of the first preferred embodiment except the difference in the configuration of the boss portion and the bearing portion. Also, in the second preferred embodiment, elements similar to those illustrated in Figs. for the first preferred embodiment are denoted by similar reference numerals, the description thereof is omitted.

Figure 12:
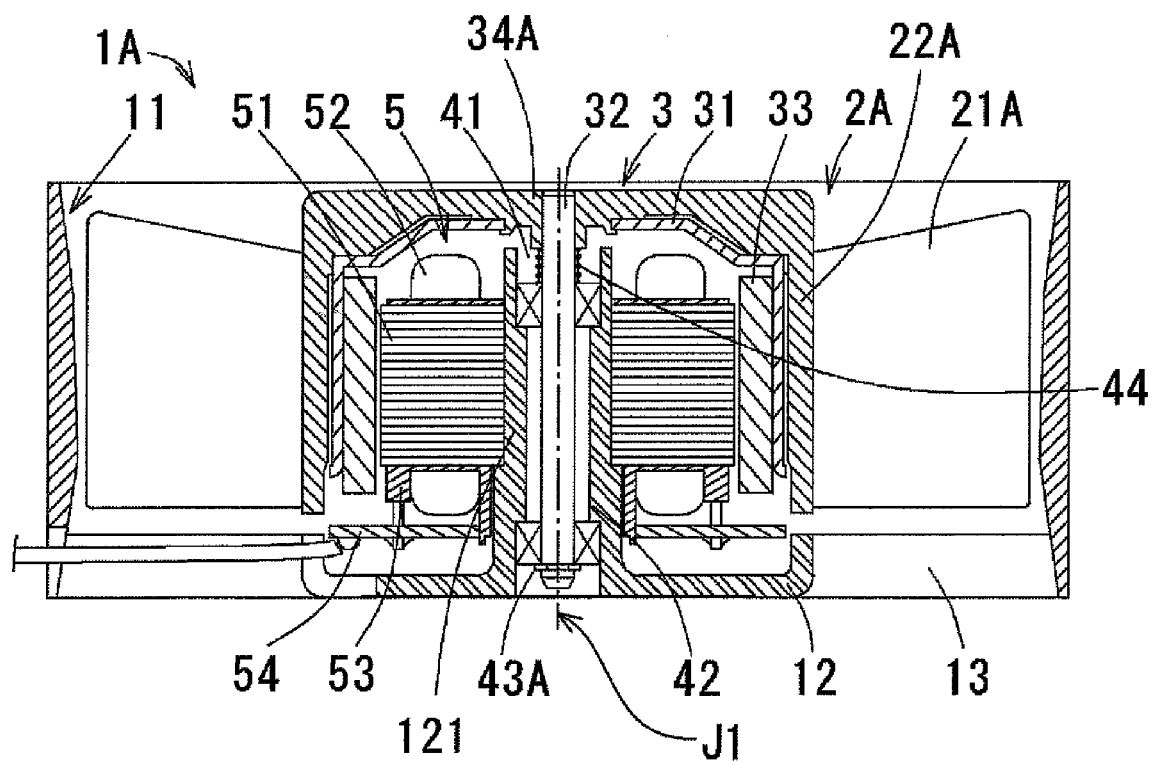
FIG. 12 is a schematic cross sectional view of a fan according to a second preferred embodiment of the present invention.
Figure 13:
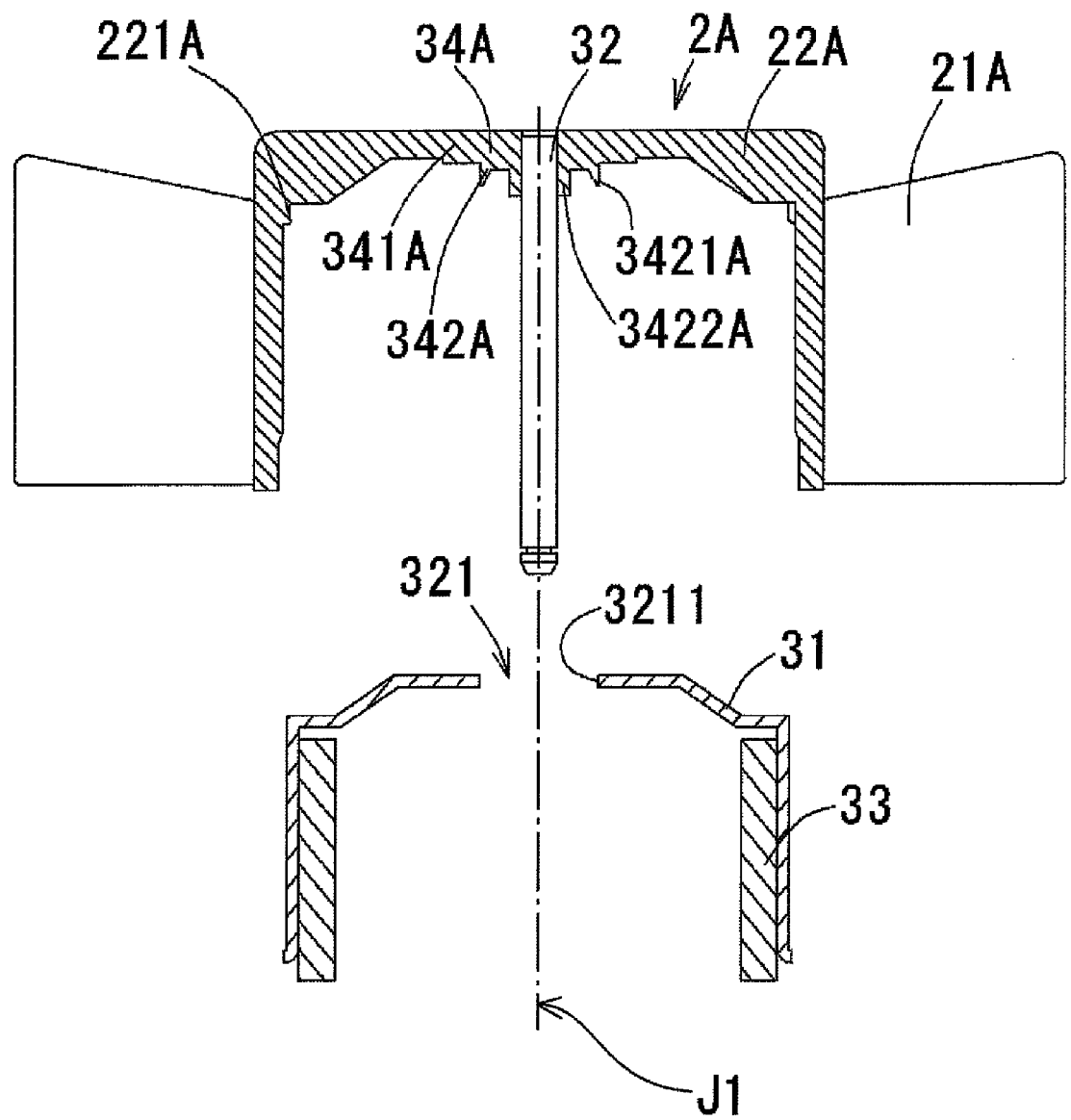
FIG. 13 is a schematic cross sectional view of an impeller and a rotor holder according to the second preferred embodiment of the present invention.
Figure 14:
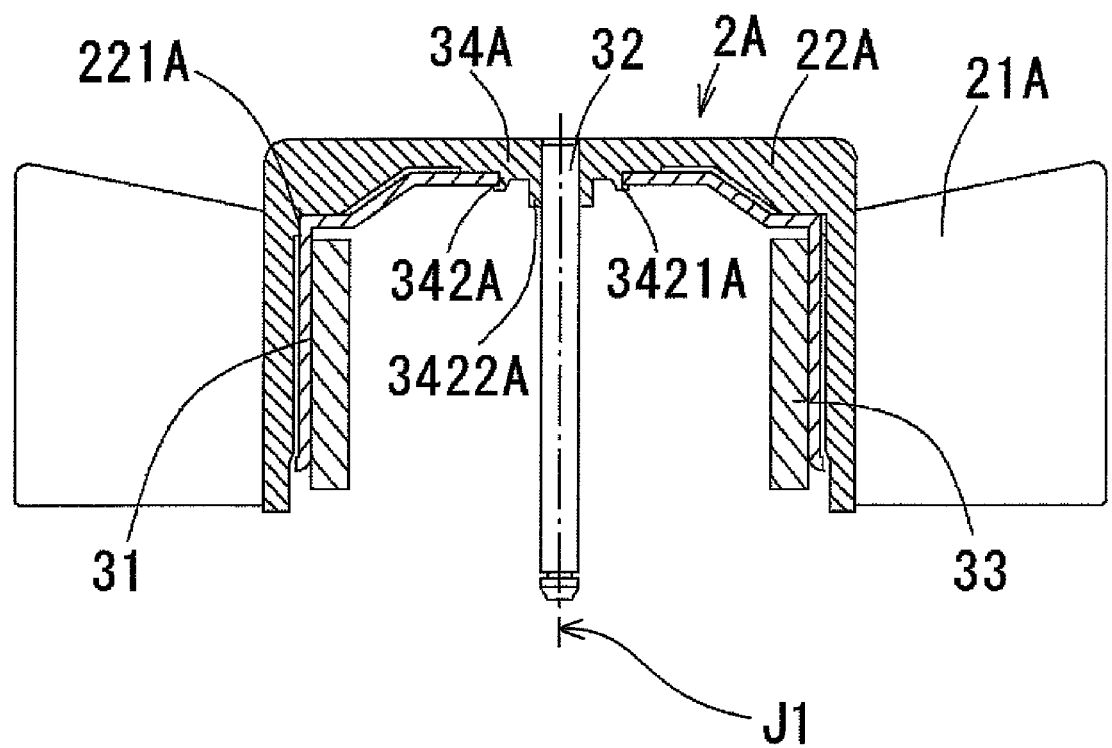
FIG. 14 is a schematic cross sectional view of the impeller affixed with the rotor holder according to the second preferred embodiment of the present invention.
Figure 15:
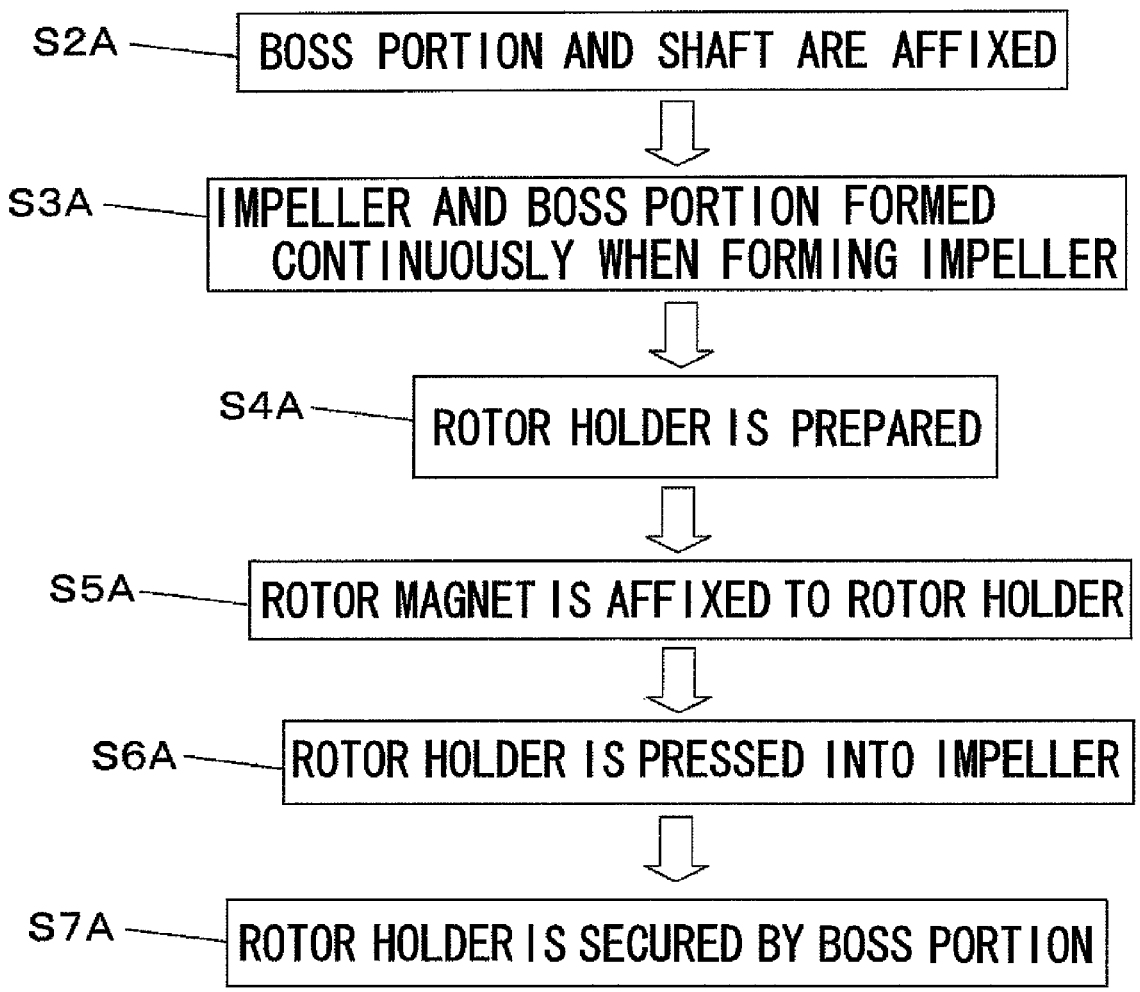
FIG. 15 is a flow chart illustrating a flow of steps of manufacturing method of the impeller and the rotor holder according to the second preferred embodiment of the present invention.

FIG. 12 is a schematic cross sectional view of the fan 1A according to the second preferred embodiment. FIG. 13 is a schematic cross sectional view of an impeller 2A and the rotor holder 31 according to the second preferred embodiment. FIG. 14 is a schematic cross sectional view of the impeller 2A affixed with the rotor holder 31 according to the second preferred embodiment. FIG. 15 is a flow chart illustrating a flow of steps of manufacturing method of the impeller 2A and the rotor holder 31.

According to the second preferred embodiment, the bearing portion preferably includes the shaft 32, the ball bearings 41, 42, step portions each corresponding to the ball bearing 41 and 42 respectively so as to secure the axial positions of the ball bearings 41 and 42. The ball bearings 41 and 42 each preferably include a plurality of balls arranged at a space between an inner ring and an outer ring of the bearings 41 and 42 wherein the inner ring rotates with respect to the outer ring. The shaft 32 is preferably inserted through the inner ring of the ball bearing 41 and that of the ball bearing 42 so as to collectively form the baring portion. A ring member 43A is preferably arranged at a lower portion of the shaft 32 in order to retain the shaft 32. Note that the coil spring 44 is arranged between the ball bearing 41 and a boss portion 34A (described below) in order to provide pressure to the ball bearings 41 and 42.

According to the second preferred embodiment, the coil spring 44 is preferably arranged at a lower surface (referred to as a cylindrical portion 3422) of the boss portion 34A which is formed continuously with the impeller cup portion 22A by injection molding. Although the degree of precision achieved by a method such as the injection molding is relatively lower compared with cutting, for example, since the present preferred embodiment includes the coil spring 44 which rotates along with the rotor portion of the fan 1A a desirable precision is achieved by the injection molding. Note that although the configuration of the present preferred embodiment includes the ball bearings, the present invention is not limited thereto.

The impeller 2A preferably includes an impeller cup portion 22A, and a plurality of blades each extending outwardly in the radial direction evenly arranged at the outer circumferential surface of the impeller cup portion 22A. The impeller 2A preferably includes at the inner circumferential surface the rotor holder 31 in order to minimize magnetic flux leakage, and the rotor magnet 33 arranged inside the rotor holder 31 is magnetized such as to include characteristics of multiple magnetic poles alternately arranged in the circumferential direction. The boss portion 34A at which the shaft 32 is affixed at one axial end thereof is preferably arranged at a substantially central portion of the impeller cup portion 22A.

As shown in FIG. 13, the boss portion 34A is arranged concentrically with the impeller 2A (step S3). Note that the boss portion 34A is formed continuously with the impeller 2A when the impeller 2A is injection molded as a single component. The boss portion 34A preferably includes an outer ring portion 341A and an inner ring portion 342A which preferably includes an annular shaped convex portion 3421A at an outer circumferential edge in the axial direction. Also, the inner ring portion 342A preferably includes at a substantially central portion thereof a cylindrical portion 3422A which supports the shaft 32 and protrudes downwardly in the axial direction (step S1A). The boss portion 34A includes a through hole at the substantially central portion thereof so as to affix an upper end of the shaft 32 (step S2A).

Hereafter, the rotor holder 31 will be described in detail. As shown in FIG. 2, the rotor holder 31 preferably includes a substantially cylindrical shape with a lid portion. The lid portion of the rotor holder 31 preferably includes at a central portion thereof the through hole 321 (step S4A). The rotor magnet 33 preferably having an annular shape is arranged at the inner circumferential surface of the cylindrical portion of the rotor holder 31 (step S5A). The rotor magnet 33 is preferably magnetized in the circumferential direction by the magnetizing yoke while the same is affixed to the inner circumferential surface of the cylindrical portion of the rotor holder 31. According to the present preferred embodiment, the rotor magnet 33 preferably includes eight magnetic poles.

Hereafter, a process of joining the rotor holder 31 with the impeller 2A will be described. The rotor holder 31 already affixed with the rotor magnet 33 is inserted into the inner circumferential surface of the impeller cup portion 22 of the impeller 2A. The rotor holder 31 is affixed to the impeller 2A by the boss portion 34A. The through hole 321 is arranged such that the inner circumferential surface includes a portion thereof that preferably makes contact with the outer circumferential surface of the inner ring portion 342A of the boss portion 34A. Note that although the present preferred embodiment assumes that the outer circumferential surface of the inner ring portion 342A makes contact with the inner circumferential surface 3211 of the through hole 321, the present invention is not limited thereto.

FIG. 14 is a schematic cross sectional view of the impeller 2A affixed with the rotor holder 31 according to the second preferred embodiment. The upper end surface of the rotor holder 31 makes contact with the boss portion 34A, then the annular shaped convex portion 3421 is plastically deformed outwardly in the radial direction by a heat welding method, an ultrasonic welding or the like. By this, a portion of the rotor holder 31 is sandwiched by the plastically deformed annular shaped convex portion 3421A and another portion of the boss portion 34A (step S7A). Note that although the present preferred embodiment assumes that the boss portion 34A includes the annular shaped convex portion 3421A in order to join the inner circumferential surface 3211 of the rotor holder 31 with the boss portion 34A, the present invention is not limited thereto; the inner ring portion 342A may be plastically deformed by a welding machine instead.

The impeller 2A preferably includes, as shown in FIGS. 13 and 14, a plurality (five in the present preferred embodiment) of convex portions 221A extending in the axial direction at an upper portion of the inner circumferential surface of the impeller cup portion 22A. Note that an envelope surface preferably includes a diameter formed by connecting an inner circumferential end of the convex portions 221A smaller than the external diameter of the rotor holder 31. That is, when the when the rotor holder 31 is arranged inside the impeller cup portion 22A and a contact is made between the rotor holder 31 and the boss portion 34A, the outer circumferential surface of the rotor holder 31 is pressed into the inner circumferential ends of the convex portions 221A (step S6A). Since the rotor holder 31 is secured at the boss portion 34A and the convex portions 221A, according to the second preferred embodiment of the present invention a similar outcome concerning the reduction of sound level is achieved as the first preferred embodiment.

What is claimed is:

1. A motor comprising:
    a shaft supported to rotate and centered about a rotary axis, the radial direction of the motor being perpendicular to the rotary axis;
    a cup portion having a side wall;
    a boss integral with the cup portion, and disposed at a radially central part of the cup portion, the shaft being affixed to the boss such that boss transmits a force of rotation from the shaft to the cup portion whereby the cup portion rotates along with the shaft about the rotary axis;
    a rotor holder disposed within the cup portion, and having a substantially cylindrical portion;
    a rotor magnet, having a substantially annular shape, integral with the rotor holder and extending along an inner circumferential surface of the cylindrical portion of the rotor holder; and
    an armature disposed opposite to the rotor magnet in the radial direction of the motor to generate with the rotor magnet a torque on the rotor holder; and
    wherein the cup portion has a plurality of convexities spaced from each other in the circumferential direction of the cup portion along an inner circumferential surface of the side wall of the cup portion, and each protruding inwardly in the radial direction from the inner circumferential surface, and
    an outer circumferential surface of the cylindrical portion of the rotor holder is engaged by the convexities, and said outer circumferential surface and the convexities are engaged with each other over only a length in the axial direction which is less than half the axial length of the rotor holder.

2. The motor according to claim 1, wherein the boss and the cup portion are discrete but integral components.

3. The motor according to claim 1, wherein
    the cup portion is a synthetic resin material or an aluminum alloy, and
    the boss is affixed to the cup portion at an inner circumferential portion of the cup portion.

4. The motor according to claim 1, wherein
    the boss includes a base, and a plastically deformed portion extending in the radial direction, and
    an inner circumferential portion of the lid portion of the rotor holder is secured between the plastically deformed portion of the boss and the base of the boss.

5. The motor according to claim 1, wherein
    the boss includes an inner ring,
    the inner ring extends through a hole provided in a lid portion of the rotor holder, and
    the inner ring includes a plurality of plastically deformed portions spaced evenly apart from one another in the circumferential direction of the boss.

6. The motor according to claim 1, wherein the boss includes a physically deformed portion.

7. The motor according to claim 1, wherein a portion of the boss includes a thermally deformed portion.

8. The motor according to claim 1, wherein a length of the convexities in the axial direction is less than the axial length of the rotor holder.

9. The motor according to claim 8, wherein the length of the convexities is less than half the axial length of the rotor holder.

10. A fan comprising:
    the motor according to claim 1; and
    a plurality of blades each arranged outside the cup portion and extending outwardly in the radial direction.

11. The fan according to claim 10, wherein
    the side wall and an axial end wall of the cup portion, the blades, and the convexities are defined by a unitary injection-molded member,
    the unitary member includes a plurality of weld lines spaced apart from one another in the circumferential direction of the unitary member, and
    each of the convexities are located between respective ones of the plurality of weld lines in the circumferential direction of the unitary member.

12. The motor according to claim 1, wherein the cylindrical portion of the rotor holder is press-fitted to the convexities.

13. The motor according to claim 1, wherein a space is formed between a lid portion of the rotor holder and an axial end wall of the cup portion.

* * * * *